| United States Patent [19] | [11] | 4,212,792 |
|---|---|---|
| Davies | [45] | Jul. 15, 1980 |

[54] COUPLED GLASS IN RUBBER MODIFIED THERMOPLASTICS

[75] Inventor: John I. Davies, Littleborough, England

[73] Assignee: TBA Industrial Products Limited, Manchester, England

[21] Appl. No.: 919,565

[22] Filed: Jun. 27, 1978

[30] Foreign Application Priority Data

May 17, 1977 [GB] United Kingdom ............... 28260/77

[51] Int. Cl.$^2$ ............................................. C08K 7/14
[52] U.S. Cl. ............................... 260/42.18; 260/42.47
[58] Field of Search ............ 260/42.18, 42.47, 857 PA

[56] References Cited

U.S. PATENT DOCUMENTS

| 3,717,615 | 2/1973 | Holub et al. ........................ 260/873 |
| 3,951,906 | 4/1976 | Farber et al. ..................... 260/42.18 |
| 4,125,514 | 11/1978 | Stabler .......................... 260/857 PA |

*Primary Examiner*—Lewis T. Jacobs
*Attorney, Agent, or Firm*—Cushman, Darby & Cushman

[57] ABSTRACT

A thermoplastic moulding material comprises styrene/acrylonitrile copolymer, an elastomeric material having elongation at break greater than the styrene acrylonitrile copolymer, a polyimide prepolymer and a reinforcing filler.

The polyimide prepolymer is an addition polyimide prepared from a polyamine and a bis-imide of an unsaturated carboxylic acid.

The specified reinforcing filler is glass fibre or mica, although other fillers may be included with these.

20 Claims, No Drawings

COUPLED GLASS IN RUBBER MODIFIED THERMOPLASTICS

TECHNICAL FIELD

The invention is concerned with plastics moulding materials, and particularly moulding materials based on thermoplastics.

Certain thermoplastics materials such as polystyrene and styrene-acrylonitrile copolymer (SAN) have excellent moulding properties but are brittle so that the impact resistance of articles moulded from them is not good. It is well known that brittle thermoplastics polymers such as polystyrene and SAN can be rendered less brittle by incorporation therein of rubber. This so called "toughening" can increase the impact strength over untreated polymer by a factor of from 2 to 6. However, it has been found that when the impact strength is increased in this way there is an accompanying undesirable decrease in strengths and moduli, which may be up to 50% lower than those of the unmodified polymer.

BACKGROUND ART

In U.K. Patent Applications Nos. 31366/75 and 41136/76 we describe moulding compositions comprising thermoplastics materials, a reinforcing filler which is either glass fibres or mica, and a minor proportion of a polyimide prepolymer, which is capable of thermosetting. The polyimide prepolymers concerned are addition polymers and their preparation is described in U.K. Pat. Nos. 1,190,718; 1,355,401; 1,355,402; 1,355,403; 1,355,405; 1,355,406 and 1,355,407.

The effect of the polyimide prepolymers in these compositions is to increase strength and impact resistance of mouldings produced therefrom.

U.S. Pat. No. 3,717,615 discloses polymer compositions based on a mixture of a mono-imide of specified general formula and a bis-imide of specified general formula. It also discloses that the mono- and bis-imides can be co-reacted with various thermoplastics during copolymerization of the imides and that the resulting compositions may be compounded with fillers including glass fibre, and with synthetic rubbers. The polyimides prepared in this specification are, however, the basis of the compositions described, and the final product in each case is a thermoset material. Where thermoplastics materials are used, their proportion is less than that of the mixture of imides and they are co-reacted in the polymerization of the imides.

U.S. Pat. No. 3,678,015 discloses reacting an organic diamine with an aliphatically unsaturated dicarbonyl reagent in a solvent system to produce a polyimide by a condensation reaction. The polyimide is said to be able to be employed in combination with various thermoplastics polymers and can be compounded with fillers including glass fibre. The compositions disclosed are thermosetting, and the polyimide is not an addition polymer, nor is the inclusion of rubbery polymers in the compositions disclosed.

DESCRIPTION OF THE INVENTION

According to the invention there is provided a thermoplastic moulding material comprising a styrene/acrylonitrile copolymer, an elastomeric material having an elongation at break greater than the styrene/acrylonitrile copolymer, a polyimide prepolymer, said prepolymer being the reaction product of a polyamine and a bis-imide of an unsaturated carboxylic acid and being capable of reacting further to give a thermoset resin, and a reinforcing filler comprising glass fibres or mica.

The styrene-acrylonitrile copolymer is a thermoplastic copolymer, containing a ratio of styrene to acrylonitrile in the range 85:15 to 60:40 by weight, and having a melt flow index (MFI) of 2 to 25 gms/10 mins at 230° C. under a 5 kg load. (The test used for MFI in this case is BS2782-105C) Such copolymers are widely commercially available.

We have found that when an elastomeric material is incorporated into a reinforced styrene/acrylonitrile copolymer as toughening agent together with a polyimide prepolymer the impact strength of the composition is increased with less reduction of the strengths or moduli than would be expected in view of prior art methods of increasing the impact strength.

As previously stated the toughening agent is an elastomeric material having an elongation at break greater than the styrene/acrylonitrile copolymer. It is preferred that the elongation at break should be significantly greater than that of the styrene/acrylonitrile copolymer, for example at least 10 times as great. We have found that both sulphur vulcanizable rubbers and thermoplastic rubbers can be used, vulcanizable rubbers preferably being used in an uncured or partially cured state. The toughening agent is included in an amount of from 1 to 50% by weight (based on the weight of the total composition) preferably from 1 to 30% and more preferably from 5 to 20%. The toughening agent preferably has a glass transition temperature below 20° C.

Preferred sulphur vulcanizable elastomeric materials are rubbers such as nitrile rubbers, polyacrylates and polyurethanes.

Preferred thermoplastic rubbers are block copolymers containing styrene e.g. block copolymers of styrene and butadiene, which have been found particularly useful in the compositions of this invention although other thermoplastic rubbers such as polybutylene have also been found effective.

The elastomeric material used must be compatible with the styrene/acrylonitrile copolymer i.e. able to be compounded with the SAN in a satisfactory manner, and should be an elastomer which improves the impact resistance of the copolymer when so compounded, in the absence of other materials.

The polyimide prepolymer is preferably incorporated in the amount of from 0.1 to 10% by weight (based on the weight of the total composition) more preferably 0.5% to 5.0% by weight. Polyimides which can be used are described, inter alia, in British Pat. Nos. 1,190,718; 1,355,401; 1,355,402; 1,355,403; 1,355,405; 1,355,406 and 1,355,407, and are believed to be formed by an addition reaction between the polyamide and the unsaturated bis-imide, rather than by a condensation reaction, the latter being the case with other polyimides.

It is preferred that the polyimide prepolymer is the reaction product of a primary diamine containing not more than 30 carbon atoms and an N,N¹ bis imide of general formula

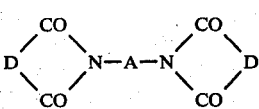

in which D represents a divalent radical containing a carbon-carbon double bond, and A is a divalent radical containing at least two carbon atoms.

Preferably the primary diamine is an aromatic compound, e.g. containing phenylene groups such as the compound of formula

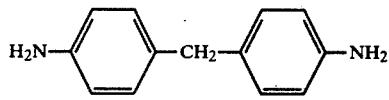

Preferably the N,N¹ bis imide is derived from an αβ unsaturated dicarboxylic acid such as maleic acid. The radical A is preferably an aromatic radical such as

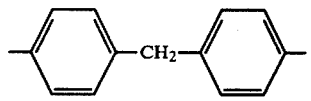

The number average molecular weight of the prepolymer is preferably no more than 5000.

The amount of filler present preferably does not exceed 50% by weight of the total composition and preferably is not less than 15 percent. The particularly preferred range is 20 to 40 percent by weight of the total composition.

The composition may optionally also include one or more other additives such as antioxidants, flame retardents, blowing agents, antistatic agents and pigments. These should not be added in such quantities, however, that the proportion by weight of styrene/acrylonitrile copolymer in the total moulding material falls too low for the composition to have satisfactory thermoplastic flow properties. Preferably the composition contains at least 30% by weight of styrene/acrylonitrile copolymer.

The composition can be prepared by any suitable method such as by milling, extrusion, injection moulding all of which are known per se. The order in which the components of the composition are compounded together is not important. For example the polyimide prepolymer can be added to the base polymer and the resultant mixture combined with the toughening agent. Alternatively the polyimide prepolymer can be added to the toughening agent and the resultant mixture combined with the base polymer. When a filler is present the polyimide prepolymer can be applied as a dressing to the filler prior to incorporation of the filler into the composition i.e. when glass fibre is used the polyimide prepolymer may be used in a dressing for the glass fibres.

EMBODIMENTS OF THE INVENTION

The following series of comparitive Examples further illustrate the invention. In the Examples all percentages are by weight of total composition unless otherwise stated.

EXAMPLE 1

A composition consisting of styrene/acrylonitrile copolymer marketed by Monsanto as "QE 1044", 30% (based on the total composition) of glass fibre marketed by TBA Industrial Products, as "ECR 1346", 2% of a polyimide prepolymer derived from an aromatic diamine and a bis-maleimide marketed by Rhone Poulenc SA as "Kerimid 601" and 5% nitrile rubber marketed by Polysar as "Krynac 802" was produced by compounding the constituents in a twin screw extruder. The nitrile rubber has an acrylonitrile content of 28% and was added as uncured crumb.

The materials were compounded on a twin-screw extruder at barrel temperatures of 200° C., 125° C., 125° C. and 190° C. (die) and the extruded composition was chopped into pellets.

The resultant material was formed into test bars by injection moulding using conventional moulding conditions for reinforced styrene/acrylonitrile copolymer (220°/250° C. barrel temperatures). The test bars were tested for tensile strength, tensile modulus, flexural strength, flexural modulus and impact strength. The results are shown in the following Table 1.

EXAMPLES 2 and 3

The same procedure was followed as in Example 1 save that the amount of nitrile rubber was increased to 10% (Example 2) and 15% (Example 3). The products were tested and the results are set out in the Table 1.

TABLE 1

| Example No. | 1<br>30% glass<br>2% polyimide<br>5% rubber | 2<br>30% glass<br>2% polyimide<br>10% rubber | 3<br>30% glass<br>2% polyimide<br>15% rubber |
|---|---|---|---|
| Tensile Strength MPa | 130 | 121 | 102 |
| Tensile Modulus GPa | 11.4 | 10.1 | 9.7 |
| Flexural Strength MPa | 1.81 | 163 | 155 |
| Flexural Modulus GPa | 9.7 | 8.7 | 8.3 |
| Notched Izod Impact J/m | 73 | 83 | 99 |
| Notched Charpy Impact KJ/m² | 7.1 | 7.9 | 9.2 |
| Unnotched Charpy Impact KJ/m² | 19 | 22 | 24 |

COMPARISON EXAMPLE 4

A composition was made in the same manner as in Example 1 except that both "Kerimid 601" and the nitrile rubber "Krynac 802" were omitted. Test bars formed from the composition by injection moulding were tested for the same properties as in Example 1. The results are set out in Table 2.

COMPARISON EXAMPLE 5

A composition was made in the same manner as in Example 1 except that the nitrile rubber "Krynac 802" was omitted. Test bars formed from the composition by injection moulding were tested. The results are shown in Table 2.

COMPARISON EXAMPLE 6

A composition was made in the same way as in Example 1 but "Kerimid 601" was omitted. The results of tests made on test bars formed from the composition are shown in the Table 2.

TABLE 2

| Example No. | 4<br>30% glass | 5<br>30% glass<br>2% polyimide | 6<br>30% glass<br>5% rubber |
|---|---|---|---|
| Tensile Strength MPa | 110 | 127 | 73 |

TABLE 2-continued

| Example No. | 4 | 5 | 6 |
|---|---|---|---|
| | 30% glass | 30% glass 2% polyimide | 30% glass 5% rubber |
| Tensile Modulus GPa | 10.7 | 11.9 | 9.3 |
| Flexural Strength MPa | 150 | 172 | 101 |
| Flexural Modulus GPa | 8.7 | 9.7 | 7.9 |
| Notched Izod Impact J/m | 44 | 60 | 57 |
| Notched Charpy Impact KJ/m² | 4.0 | 5.3 | 6.3 |
| Unnotched Charpy Impact KJ/m² | 10.0 | 13.2 | 14.9 |

EXAMPLES 7 TO 22

A series of compositions of increasing glass fibre content were prepared each containing the styrene/acrylotrile copolymer of Example 1. For comparison, compositions of corresponding glass content were prepared in which 2 parts SAN by weight per 100 of composition were replaced by the polyimide prepolymer KERIMID 601; further compositions of corresponding glass content were prepared in which 15 parts of SAN per 100 of composition were replaced by the nitrile rubber KRYNAC 802; and further compositions of corresponding glass content were prepared in which 17 parts of SAN by weight per 100 of composition were replaced by 2 parts by weight of the polyimide prepolymer KERIMID 601 and 15 parts by weight of the nitrile rubber KRYNAC 802.

Compounding was carried out as in Example 1 and then test samples were injection molded and tested as before. The physical properties of the samples so obtained are tabulated in table 3, 4, 5 and 6 each Table representing comparative results at a particular glass content. In these tables, for brevity, the polyimide prepolymer is represented by "PI" and the nitrile rubber by "R".

It will be noted that at each glass content the addition of the polyimide prepolymer alone gives some improvement in tensile, flexural and impact strengths. The addition of the nitrile rubber alone has a beneficial effect on impact strength but is detrimental to flexural strength in particular. The addition of both the polyimide prepolymer and the nitrile rubber gives a massive improvement in impact strength but also has very little effect on tensile or flexural strength despite the massive loss of flexural strength caused by addition of rubber alone (see particularly tables 5 and 6.)

Table 3

| | (SAN filled with 15% by weight of glass fiber) | | | |
|---|---|---|---|---|
| Example No. | 7 | 8 | 9 | 10 |
| | SAN + 15% glass | + 2% PI | + 15% R | + 2% PI + 15% R |
| Tensile Strength MPa | 87 | 96 | | 62 |
| Flexural Strength MPa | 109 | 120 | 81 | 100 |
| Flexural Modulus GPa | 5.0 | 5.4 | 3.4 | 4.2 |
| Notched Izod Impact J/m | 31 | 36.1 | 63 | 76 |
| Notched Charpy Impact kJ/m² | 3.4 | 4.7 | 6.1 | 8.3 |

Table 3-continued

| | (SAN filled with 15% by weight of glass fiber) | | | |
|---|---|---|---|---|
| Example No. | 7 | 8 | 9 | 10 |
| | SAN + 15% glass | + 2% PI | + 15% R | + 2% PI + 15% R |
| Unnotched Charpy Impact kJ/m² | 9.7 | 13.7 | 17.1 | 22 |
| DTUL (0.46 MPa) °C. | 103 | | | 100 |
| Specific Gravity | 1.18 | 1.18 | 1.14 | 1.16 |

Table 4

| | (SAN filled with 25% by weight of glass fiber) | | | |
|---|---|---|---|---|
| Example No. | 11 | 12 | 13 | 14 |
| | SAN + 15% glass | + 2% PI | + 15% R | + 2% PI + 15% R |
| Tensile Strength MPa | 96 | 121 | | 84 |
| Flexural Strength MPa | 139 | 152 | 75 | 135 |
| Flexural Modulus GPa | 6.9 | 7.6 | 4.5 | 6.4 |
| Notched Izod Impact J/m | 39 | 62.0 | 69 | 97 |
| Notched Charpy Impact kJ/m² | 3.8 | 7.0 | 7.0 | 9.1 |
| Unnotched Charpy Impact kJ/m² | 9.4 | 19.8 | 16.6 | 25 |
| DTUL (0.46 MPa) °C. | 104 | | | 103 |
| Specific Gravity | 1.26 | 1.26 | 1.23 | 1.24 |

Table 5

| | (SAN filled with 35% of weight of glass fiber) | | | |
|---|---|---|---|---|
| Example No. | 15 | 16 | 17 | 18 |
| | SAN + 35% glass | + 2% PI | + 15% R | + 2% PI + 15% R |
| Tensile Strength MPa | 99 | 127 | | 92 |
| Flexural Strength MPa | 161 | 175 | 62 | 153 |
| Flexural Modulus GPa | 9.4 | 9.8 | 5.6 | 8.2 |
| Notched Izod Impact J/m | 44 | 62.8 | 69 | 113 |
| Notched Charpy Impact kJ/m² | 4.0 | 7.3 | 6.4 | 10.0 |
| Unnotched Charpy Impact kJ/m² | 9.0 | 19.4 | 16.5 | 27 |
| Specific Gravity | 1.35 | 1.36 | 1.31 | 1.33 |

Table 6

| | (SAN filled with 45% by weight of glass fiber) | | | |
|---|---|---|---|---|
| Example No. | 19 | 20 | 21 | 22 |
| | SAN + 45% glass | + 2% PI | + 15% R | + 2% PI + 15% R |
| Tensile Strength MPa | 100 | 126 | | 90 |
| Flexural Strength MPa | 170 | 193 | 47 | 162 |
| Flexural Modulus GPa | 12.3 | 12.1 | 6.9 | 9.4 |
| Notched Izod Impact J/m | 45 | 60.2 | 67 | 164 |
| Notched Charpy Impact kJ/² | 4.0 | 6.7 | 6.3 | 10.2 |
| Unnotched Charpy Impact kJ/m² | 8.6 | 13.0 | 16.2 | 25.5 |

Table 6-continued

|  | (SAN filled with 45% by weight of glass fiber) | | | |
|---|---|---|---|---|
| Example No. | 19 SAN + 45% glass | 20 + 2% PI | 21 + 15% R | 22 + 2% PI + 15% R |
| DTUL (0.46 MPa) °C. | 105 | | | 105 |
| Specific Gravity | 1.46 | 1.46 | 1.40 | 1.40 |

EXAMPLES 23 TO 26

These examples show that the invention can be used in a composition in which another filler and flame retardants are present in addition to glass fibres.

A composition was prepared by compounding together the following ingredients in a twin-screw extruder in the same manner as described in Example 1. The ingredients were 60 parts by weight of styrene/acrylonitrile copolymer (Monsanto QE1044 as in Example 1.) 15 parts by weight of glass fibres, (ECR 1346 as in Example 1) 15 parts by weight of talc and 10 parts by weight of fire retardants. The fire retardants consisted of a 3:1 w/w mixture of decabromobiphenyl (Flammex B10 commercially available from Berk Ltd.) and Antimony Trioxide.

Three comparable compositions were prepared by respectively replacing (i) 2 parts of the styrene/acrylonitrile copolymer (SAN) by 2 parts of the polyimide prepolymer KERIMID 601, (ii) 15 parts of the SAN by 15 parts of PERBUNAN N2810 (a nitrile rubber containing 28% by weight of acrylonitrile and commercially available from Farbenfabriten Bayer AG) and (iii) 7 parts of SAN by 2 parts of the KERIMID 601 and 5 parts of the PERBUNAN N2810.

Test mouldings were made from these compositions as before, and the results of physical testing and fire testing of the mouldings are given below in Table 7. In this table the polyimide prepolymer is referred to as "PI" and the rubber as "R".

Table 7

| Example No. | 23 No Impact Modifier | 24 2% PI | 25 5% R | 26 2% PI +5% R |
|---|---|---|---|---|
| Tensile Strength MPa | 85 | 88 | 59 | 84 |
| Tensile Modulus GPa | 10.4 | 9.7 | 6.6 | 8.0 |
| Flexural Strength MPa | 108 | 115 | 81 | 113 |
| Flexural Modulus GPa | 7.4 | 8.1 | 6.4 | 7.1 |
| Notched Izod Impact J/m | 24 | 35 | 39 | 49 |
| Notched Charpy Impact kJ/m² | 2.9 | 4.2 | 4.1 | 5.0 |
| Unnotched Charpy Impact kJ/m² | 13.6 | 11.4 | 12.1 | 12.5 |
| DTUL (0.46 MPa) °C. | 103 | 104 | 101 | 104 |
| Specific Gravity | 1.43 | 1.40 | 1.39 | 1.41 |
| Flammability Rating (to Lloyd's Underwriter's) test UL94 | V-O | V-O | V-O | V-O |

EXAMPLES 27 TO 30

These examples investigate the effect of curing the rubber before it is compounded into the composition.

Four compositions were prepared using SAN and glass as used in Example 1. Each composition contained 30% by weight of glass fibre.

Two compositions contained 5% by weight of a nitrile rubber (KRYNAC 802) one having uncured rubber incorporated into it and the other having cured rubber incorporated into it. The other two compositions also contained 5% of uncured and cured rubber respectively but additionally contained 2% by weight of the polyimide prepolymer KERIMID 601. In each case SAN made up the whole of the balance of the composition.

The compounding was carried out in a twin screw extruder under the same conditions as in Example 1, and test mouldings were injection moulded from each of the four compositions.

The cured rubber was a compounded rubber in which the following formulation was compounded on a mill and press cured for 10 minutes at 150° C. in sheets 1.5 mm thick. Under these conditions the rubber was substantially fully vulcanised i.e. 95% of available cross linking sites used up.

The rubber formulation was:

| KRYNAC 802 | 100 | parts by weight |
|---|---|---|
| Zinc Oxide | 5 | parts by weight |
| Stearic Acid | 1 | parts by weight |
| TMT | 3 | parts by weight |
| Sulphur | 1 | parts by weight |

(TMT is tetramethyl thiuram disulphide)

The physical properties of the mouldings from the four different compositions are given below in Table 8 in which cured rubber is signified by "CR", uncured rubber by "UR" and the polyimide prepolymer by "PI".

Table 8

| Example No. | 27 5% UR | 28 5% CR | 29 5% UR 2% PI | 30 5% CR 2% PI |
|---|---|---|---|---|
| Tensile Strength MPa | 73 | 80 | 130 | 118 |
| Tensile Modulus GPa | 9.3 | 11.8 | 11.4 | 10.8 |
| Flexural Strength MPa | 101 | 103 | 181 | 160 |
| Flexural Modulus GPa | 7.9 | 8.7 | 9.7 | 8.3 |
| Notched Izod Impact J/m | 57 | 33 | 73 | 65 |
| Notched Charpy Impact kJ/m² | 6.3 | 3.7 | 7.1 | 6.2 |
| Unnotched Charpy Impact kJ/m² | 14.9 | 7.3 | 19.0 | 15.8 |
| DTUL (0.46 MPa) °C. | 103 | 103 | 105 | 104 |
| Specific Gravity | 1.32 | 1.34 | 1.34 | 1.34 |

These results show that the same sort of advantage is obtained when the polyimide prepolymer and cured rubber are used as when the polyimide prepolymer and uncured rubber are used. However, the cured rubber is less effective than the uncured rubber in improving the impact strength of the glass filled SAN (These Examples may be compared directly with Example 4 (Table 2) which gives the properties of the glass/SAN without additives).

EXAMPLES 31 TO 42

The following examples illustrate the use of the invention with various kinds of commercially available synthetic rubbers. In every case the composition was compounded as in Example 1, using the same type of SAN, glass fibre and polyimide prepolymer as in Example 1, to the following formulation: Glass fibre 30 parts by weight, polyimide prepolymer 2 pbw, Rubber 5 pbw and SAN 63 pbw.

Test mouldings were made as before by injection moulding, and the properties of the mouldings were measured.

The rubbers used in the various examples were as follows:

Example 31—"HYCAR 1411", a nitrile rubber containing 41% by weight of acrylonitrile, the remainder being butadiene, commercially available from B F Goodrich. Used uncured Example 32—"HYCAR 1422", another nitrile rubber, containing 33% by weight acrylonitrile, available from B. F. Goodrich and used uncured.

Example 33—"CHEMIGUM N8B" a nitrile rubber containing 32% by weight acrylonitrile, available from Goodyear, and used uncured.

Example 34—"PARACRIL D" a nitrile rubber containing 45% by weight acrylonitrile, available from Uniroyal and used uncured.

Example 35—"ELASTOTHANE 640" a polyurethane rubber, sulphur vulcanizable available from Thiokol Chemical Corporation. Used uncured.

Example 36—"CARIFLEX TR1102" a thermoplastic rubber available from Shell. This is an S-B-S block copolymer of polystyrene and polybutadiene.

Examples 37 and 38—"SOLPRENE 415" and "SOLPRENE 416" both thermoplastic rubbers available from Philips Petroleum. Both are block copolymers of styrene and butadiene containing respectively 40% styrene and 60% butadiene and 30% styrene and 70% butadiene.

Examples 39 and 40—"Polybutylene Grade 20" and "Polybutylene Grade 0.5" both thermoplastic rubbery polybutylenes available from CdF Chemie.

Example 41—"HYTREL 6345" a thermoplastic polyester elastomer available from Du Pont de Nemours.

Example 42—"CYANACRYL R" a sulphur vulcanizable polyacrylate elastomer available from American Cyanamid Company.

The physical test results obtained on the mouldings from the various compositions are given below in Tables 9 and 10.

Table 9

| Example No. | 31 | 32 | 33 | 34 | 35 | 36 |
|---|---|---|---|---|---|---|
| Tensile Strength MPa | 125 | 125 | 118 | 118 | 116 | 117 |
| Tensile Modulus GPa | 10.6 | 10.2 | 9.7 | 9.5 | 11.2 | 10.4 |
| Flexural Strength MPa | 174 | 172 | 175 | 172 | 172 | 177 |
| Flexural Modulus GPa | 9.3 | 9.3 | 8.4 | 7.9 | 9.2 | 9.2 |
| Notched Izod Impact J/m | 67 | 64 | 71 | 78 | 71 | 66 |
| Notched Charpy Impact kJ/m$^2$ | 6.9 | 6.5 | 7.0 | 7.4 | 3.7 | 7.4 |
| Unnotched Charpy Impact kJ/m$^2$ | 18.0 | 15.9 | 20.0 | 21.0 | 19.0 | 15.0 |
| DTUL (0.46 MPa) °C. | 104 | 107 | 104 | 105 | 94 | 103 |
| Specific Gravity | 1.33 | 1.33 | 1.30 | 1.28 | 1.34 | 1.31 |

Table 10

| Example No | 37 | 38 | 39 | 40 | 41 | 42 |
|---|---|---|---|---|---|---|
| Tensile Strength MPa | 123 | 122 | 112 | 122 | 105 | 119 |
| Tensile Modulus GPa | 10.4 | 10.5 | 9.9 | 10.9 | 10.8 | 9.6 |
| Flexural Strength MPa | 192 | 190 | 176 | 188 | 144 | 157 |
| Flexural Modulus GPa | 9.4 | 9.5 | 9.3 | 10.0 | 9.8 | 8.1 |
| Notched Izod Impact J/m | 76 | 72 | 74 | 71 | 70 | 68 |
| Notched Charpy Impact kJ/m$^2$ | 7.9 | | 7.9 | 7.4 | 6.6 | 7.1 |
| Unnotched Charpy Impact kJ/m$^2$ | 19.0 | 14.0 | 16.0 | 13.0 | 17.0 | |
| DTUL (0.46 MPa) °C. | 101 | 103 | 104 | 104 | 101 | |
| Specific Gravity | 1.32 | 1.32 | 1.32 | 1.32 | 1.34 | 1.30 |

As can be seen from these results, both the sulphur vulcanizable rubbers and the thermoplastic rubbers gave results showing improvement in impact strength without the accompanying loss of flexural strength which results from use of rubbers alone.

This series of Examples is comparable with Examples 4 and 5 (Table 2) which show the properties of the glass/SAN alone and with 2% of the polyimide prepolymer.

I claim:

1. A thermoplastic moulding material comprising, in percent by weight of the molding material,
    a styrene acrylonitrile copolymer,
    from about 1 to about 30% of an elastomeric material having an elongation at break greater than the styrene acrylonitrile copolymer, from about 0.5 to about 5% of a polyimide pre-polymer that is the reaction product of a polyamine and a bis-imide of an unsaturated carboxylic acid and being capable of reacting further to give a thermoset resin, and
    from at least 15% up to not more than 50% of a reinforcing filler selected from the group consisting of glass fibers and mica.

2. A moulding material according to claim 1 in which the elastomeric material has an elongation at break at least 10 times as great as the styrene acrylonitrile copolymer.

3. A material according to claim 1 in which the elastomeric material is included in an amount of from 5 to 20%.

4. A material according to claim 1 in which the elastomeric material is a sulphur vulcanizable rubber.

5. A material according to claim 4 in which the rubber is substantially uncured.

6. A material according to claim 4 or 5 in which the elastomeric material is a nitrile rubber, a polyacrylate rubber or a polyurethane.

7. A material according to claim 1 in which the elastomeric material is a thermoplastic rubber.

8. A material according to claim 7 in which said thermoplastic rubber is a polybutylene, or a block copolymer of styrene and butadiene.

9. A material according to claim 1, 4 or 7 in which the polyimide pre-polymer comprises the reaction product of a primary diamine containing not more than 30 carbon atoms and an N,N¹ bis-imide of general formula

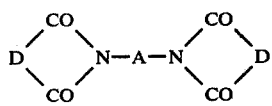

in which D represents a divalent radical containing a carbon-carbon double bond and A is a divalent radical containing at least two carbon atoms.

10. A moulding material according to claim 9 in which the primary diamine is an aromatic compound.

11. A moulding material according to claim 10 in which the primary diamine is the compound of the formula

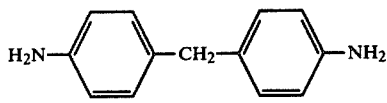

12. A moulding material according to claim 9 in which the radical D in the N,N¹ bis-imide is derived from an $\alpha\beta$ unsaturated dicarboxylic acid.

13. A moulding material according to claim 12 in which the radical D is derived from maleic acid.

14. A moulding material according to claim 9 in which the radical A in the N,N¹ bis-imide is an aromatic radical.

15. A moulding material according to claim 14 in which the radical A has the formula

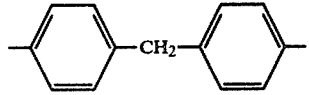

16. A moulding material according to claim 11 in which the molar ratio of bis-imide to polyamine is in the range 1.2 to 1 up to 50 to 1.

17. A moulding material according to claim 1 in which the amount of said reinforcing filler is in the range 20% to 40% by weight.

18. A moulding material according to claim 1 which also includes a filler other than glass fibres and mica.

19. A moulding material according to claim 1 in which the proportion of thermoplastic styrene acrylonitrile co-polymer is not less than 30% by weight of the moulding material.

20. A thermoplastic moulding material comprising, in percent by weight of the moulding material, of:
(1) at least about 30% of a styrene-acrylonitrile copolymer;
(2) from about 1 to about 30% by weight of an elastomeric material having an elongation at break at least 10 times greater than the styrene-acrylonitrile copolymer;
(3) from about 0.5 to about 5% of a polyimide prepolymer comprising the reaction product of a primary diamine of the formula:

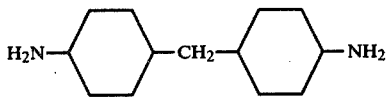

and an N,N² bis-imide of the formula:

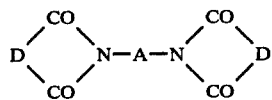

Wherein D is a divalent radical containing a carbon-carbon double bond and A is a divalent radical containing at least two carbon atoms, said polyimide prepolymer capable of reacting further to give a thermoset resin, and
(4) from at least 15% up to not more than 50% of a reinforcing filler including glass fibers and mica.